W. KLOCKE.
PROCESS OF MANUFACTURING METAL LATHING.
APPLICATION FILED FEB. 2, 1909.

928,917.

Patented July 20, 1909.
2 SHEETS—SHEET 1.

WITNESSES:
Fred White
René Bruine

INVENTOR:
William Klocke,
By Attorneys,

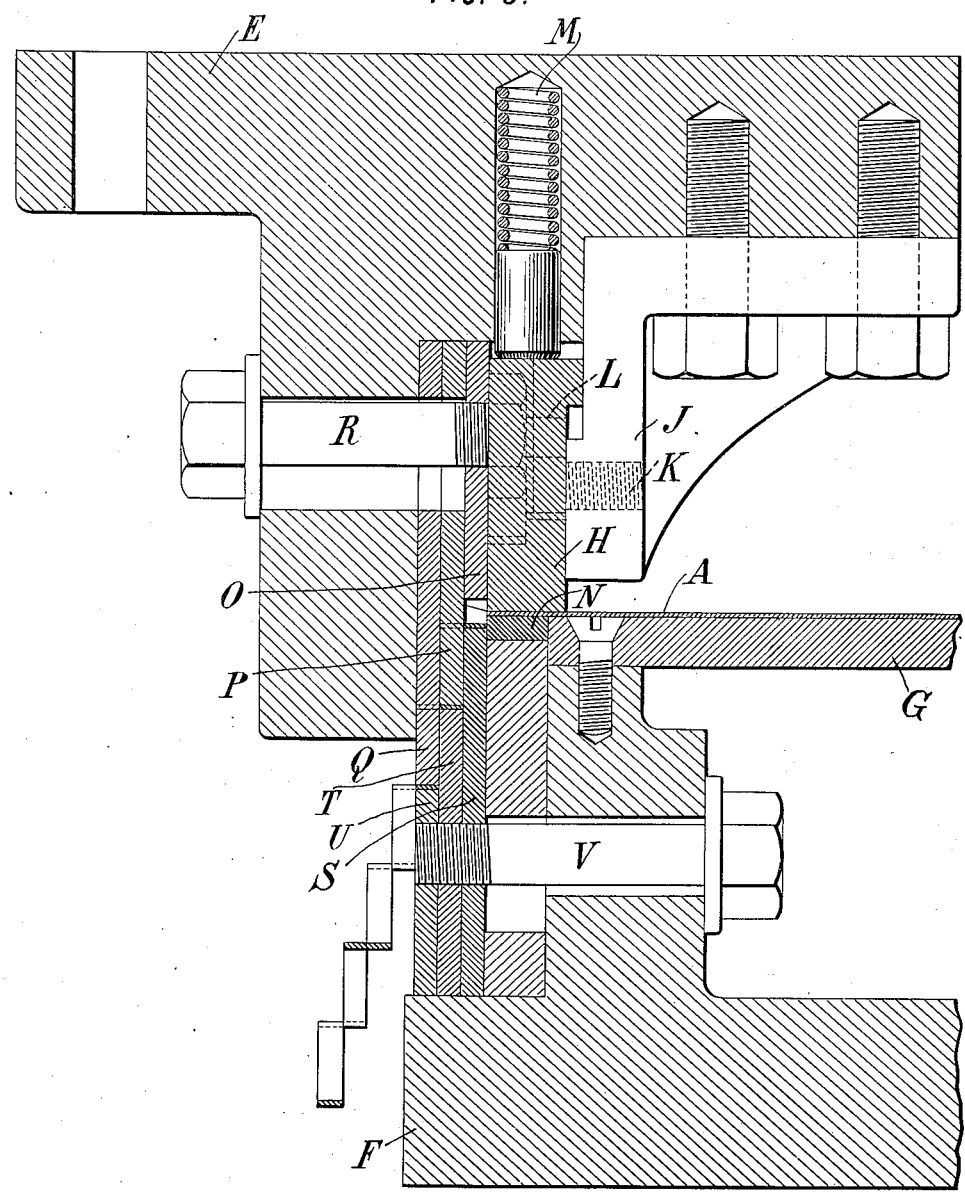

UNITED STATES PATENT OFFICE.

WILLIAM KLOCKE, OF BROOKLYN, NEW YORK, ASSIGNOR TO E. W. BLISS COMPANY, OF BROOKLYN, NEW YORK, A CORPORATION OF WEST VIRGINIA.

PROCESS OF MANUFACTURING METAL LATHING.

No. 928,917.     Specification of Letters Patent.     Patented July 20, 1909.

Original application filed May 27, 1908, Serial No. 435,272. Divided and this application filed February 2, 1909. Serial No. 475,549.

*To all whom it may concern:*

Be it known that I, WILLIAM KLOCKE, a citizen of the United States, residing in the borough of Brooklyn, county of Kings, city and State of New York, have invented certain new and useful Improvements in Processes of Manufacturing Metal Lathing, of which the following is a specification.

This invention aims to provide an improved method of manufacture of metal lathing, and especially lathing of the type known as expanded metal, made by punching and stretching a sheet to form successive sinuous lines staggered relatively to each other, so that the sheet is finally converted into a series of approximately hexagonal meshes in planes perpendicular to the plane of the sheet.

Metal lathing cut and stretched according to other systems may also be produced by the use of this invention.

I propose to effect the cutting and the stretching or forming of the meshes in successive operations, using separate tools each of which is adapted to perform its function better and to be more durable than where a single punch is used to effect both the cutting and the stretching. I propose also to positively retain a line of finished meshes in shape while forming the following line of meshes, so as to avoid the distortion of the previously finished line which would otherwise occur. Preferably a compound die is used, having a cutter, a stretcher, and a retainer, arranged in such positions as to act simultaneously upon successive lines of the sheet to cut, stretch and hold in shape the work at each operation of the machine.

Other points of improvement are referred to in detail hereinafter.

The accompanying drawings illustrate embodiments of the invention.

Figure 1:
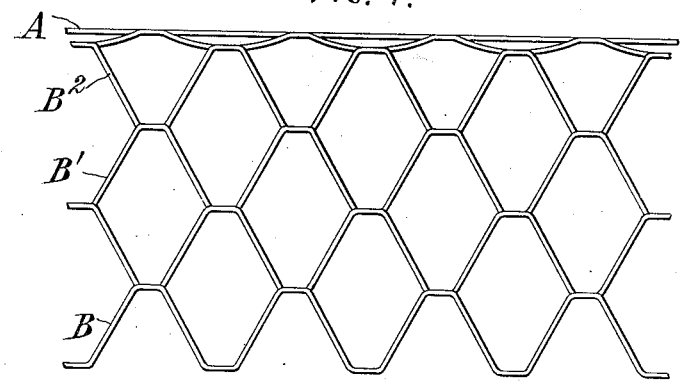
Figure 2:
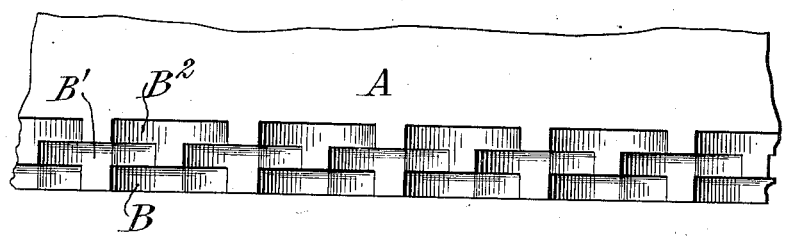
Figure 3:
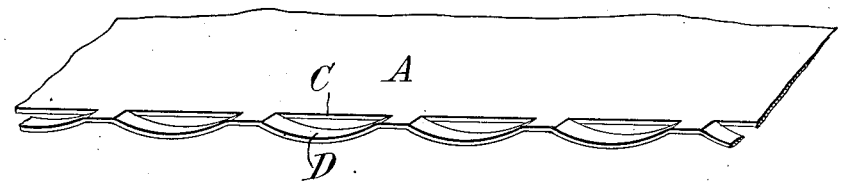
Figure 4:
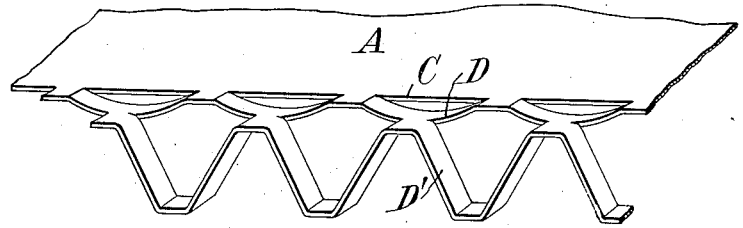

Figures 1 and 2 are respectively a face view and a plan of a sheet partly converted into expanded metal. Figs. 3 and 4 are perspective views illustrating successive steps of the process. Fig. 5 is a vertical section of a suitable form of apparatus for carrying out the process.

Referring to the drawings, the sheet of metal which is to be converted into expanded metal lathing is indicated at A. It is slitted and bent down as described to form lines B B' B² of the sinuous character indicated. The movement commences at the forward edge. After the formation of each sinuous line the sheet is fed a step forward and staggered alternately to the right and to the left, so that the successive sinuous lines are staggered relatively to each other and form the hexagonal meshes shown. Since the stretching of the metal is in a direction at right-angles to the plane of the original sheet, the finished work hangs downwardly in the manner indicated in Fig. 5.

The forward edge of the sheet is advanced into the machine, and the first line of slits C formed by a cutting tool, which at the same time very slightly stretches the metal lying in advance of the slit C, preferably just enough to produce a slit C of the full length with certainty.

In the following operation the slightly stretched portion D is further stretched in the form shown at D' (Fig. 4), while a new line of slightly bent portions D is formed, and a new line of slits C. In the next operation the parts D are again fully stretched to the shape D', being offset by a staggered feed mechanism of any known or suitable type. In stretching the slightly bent portion D to form the sharply or deeply bent portion D', there is a tendency to distort the previous finished line. Consequently I provide for retaining the finished line D' in shape, between a pair of correspondingly shaped dies, simultaneously with the further stretching of the part D. By this division of the work the movement of the compound tool or group of tools may be comparatively slight, a very rapid operation can be secured, and a perfect form for the finished product is insured.

In the machine shown a block E is fastened to the cross-head of the apparatus, or is otherwise reciprocated rapidly up and down. A stationary block F carries a table G which supports the sheet A. A holder H is fastened to a bracket J depending from the block E by means of a pin K working in a slot L in the holder, and is pressed down by a spiral spring M located in a recess in the block E. This holder, or a number of such holders arranged along the line of work, engages the plate A and holds it down upon the fixed cutter N before the movable tools strike the work.

The movable dies include a series of cutting dies O, forming or stretching dies P, and retaining dies Q, which are fastened adjacent to each other in the manner shown by means of bolts R passing through a depending flange of the block E. In line with these are the fixed dies S, T and U fastened by a bolt V to an upward extension of the lower block F. The shapes of the several dies conform to the shapes of the stretched portions D of the sheet and the sinuous lines B B' B².

The details of the machine are illustrated more fully in my application No. 435,272, filed May 27, 1908, covering the apparatus, and of which the present application is a division; no claim to the apparatus being made in this application.

What I claim is:—

1. In the manufacture of metal lathing, the process which consists in cutting and stretching the metal for a single row of cuts in a plurality of successive operations, performing these operations simultaneously upon two adjacent rows of cuts.

2. In the manufacture of metal lathing, the process which consists in cutting and stretching the metal for a single row of cuts in a plurality of successive operations, performing the stretching by a strain in a direction transverse to the plane of the sheet.

3. In the manufacture of metal lathing, the process which consists in intermittently completing the cut and effecting part of the stretching in a first operation, and completing the stretch in a second operation, performing these operations simultaneously upon two adjacent rows of cuts, and feeding the sheet intermittently in the intervals between the cutting and stretching operations.

4. In the manufacture of metal lathing, the process which consists in forming a line of meshes and retaining a line of finished meshes in shape while forming the following line, so as to avoid deforming the finished line in the forming of the following line.

5. In the manufacture of metal lathing, the process which consists in cutting the metal, stretching it, and retaining the stretched metal of a finished line of meshes in shape while stretching the following line so as to avoid deforming the finished line in the forming of the following line.

In witness whereof, I have hereunto signed my name in the presence of two subscribing witnesses.

WILLIAM KLOCKE.

Witnesses:
ARTHUR C. FRASER,
FRED WHITE.